Sept. 17, 1968   S. L. PARKER   3,401,889
COMBINATION GRAVITY BED RESERVOIR AND HOPPER-PLUS-SCATTERER
Filed Oct. 21, 1965   3 Sheets-Sheet 1

INVENTOR.
SHIRLEY L. PARKER
BY
ATTORNEYS

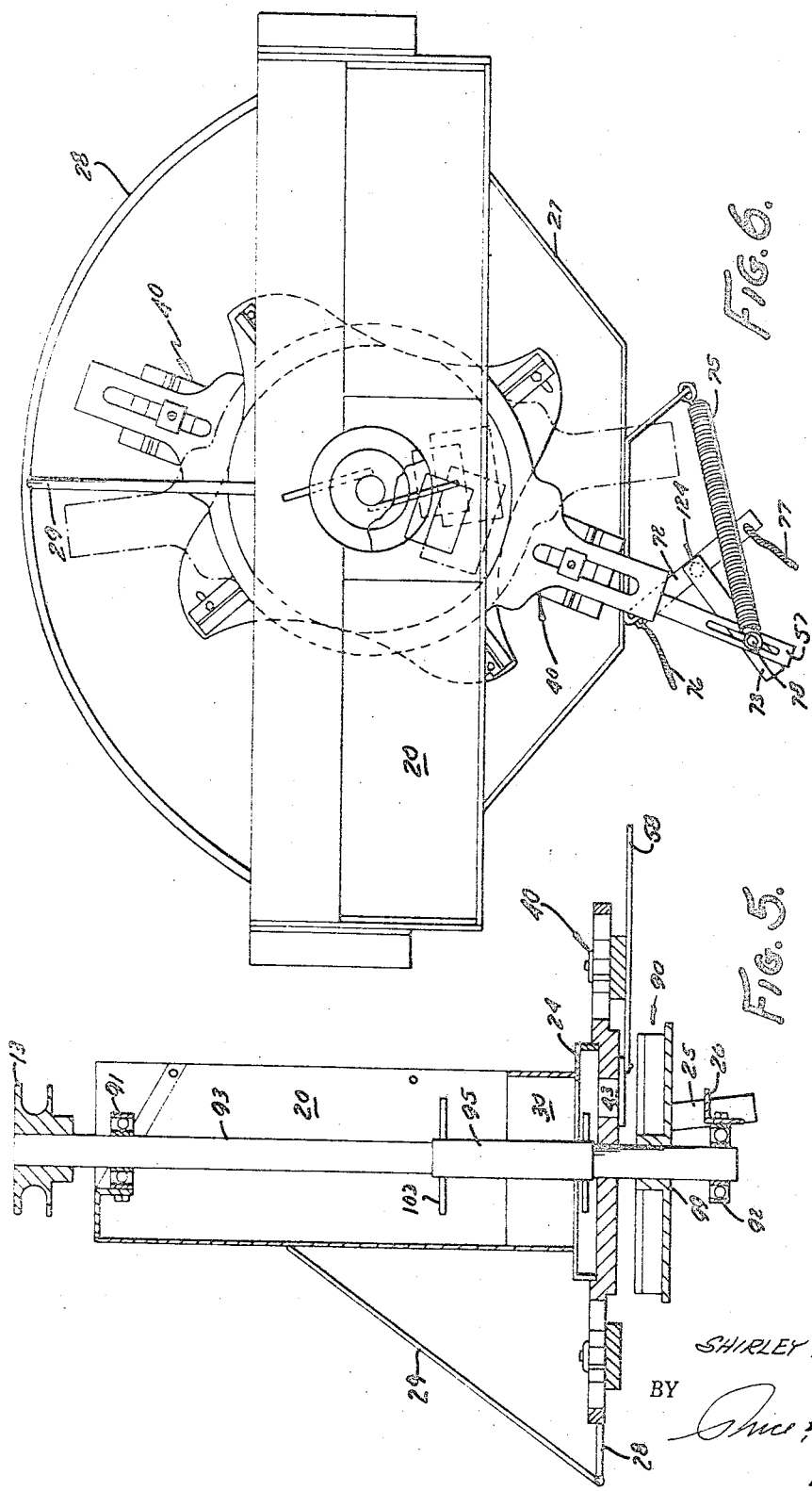

United States Patent Office 3,401,889
Patented Sept. 17, 1968

3,401,889
COMBINATION GRAVITY BED RESERVOIR AND
HOPPER-PLUS-SCATTERER
Shirley L. Parker, Warsaw, Ind., assignor to Parker
Feeders, Inc., Silver Lake, Ind., a corporation of
Indiana
Filed Oct. 21, 1965, Ser. No. 499,818
9 Claims. (Cl. 239—666)

ABSTRACT OF THE DISCLOSURE

A spreader mechanism for spreading particulate material particularly adapted for use in combination with a standard, side-opening gravity bed. The spreader mechanism has an open-sided hopper adapted to be detachably affixed to the gravity bed over the opening therein. The particulate material flows from the hopper through a valving arrangement onto a rotating spreader fan and is centrifugally hurled sideways of the gravity bed.

This application relates to spreaders for free flowing material and, more particularly, to spreaders particularly adapted for use in conjunction with most standard gravity beds.

In many different types of agricultural and maintenance operations it is often desirable to spread some type of free flowing material over a particular area. The operation may, for example, consist of applying salt to an icy street or applying fertilizer or seed to farm land. In the past it has been necessary for farmers and maintenance organizations to purchase and maintain at great expense a complete unit for executing these spreading operations. Even where such complete units are purchased and maintained, their operational characteristics are often unsatisfactory for a particular spreading operation. They may be unsatisfactory because of the inability to positively control the amount of material spread over each given area, because of the inability to control the width of the spreader swath, or because of the inability to positively insure a constant supply of material to the spreading mechanism.

It is an object of this invention to provide a combination spreader and gravity bed.

It is an object of this invention to provide a spreading mechanism which may be utilized in conjunction with equipment already in the possession of many farmers and maintenance organizations.

More particularly, it is an object of this invention to provide a combination gravity bed and spreader mechanism which the spreader mechanism may be easily attached to and removed from the standard gravity bed, and thus allow utilization of the gravity bed for purposes other than spreading of free flowing material.

It is an object of this invention to provide a spreader mechanism detachably mounted to a standard gravity bed having means whereby the amount of free flowing material spread over a specified surface area may be positively controlled.

It is an object of this invention to provide a spreader detachably mounted to a standard gravity bed having means whereby the discharge angle of the airborne material may be adjusted.

It is an object of this invention to provide a spreader which renders distinct types of equipment multi-purpose from the standpoint that they may be utilized to form the most expensive components of the spreading machine when it is desired to spread free flowing material, but, by detaching the spreader unit, may be easily reconverted to perform other types of functions.

These and other objects of this invention will be readily understood by reference to the following specification and accompanying figures in which:

FIG. 5 is a side elevational view of the spreader mechanism; and

FIG. 6 is a plan view of the spreader mechanism particularly illustrating in phantom the various modes of adjustment of the discharge angle.

Briefly, this invention comprises a gravity bed having a front, a rear and two sides mounted on a wheeled frame, one of said sides being essentially vertical and having an opening therein. An adjustably mounted door is provided whereby the size of the opening may be controlled. A hopper adapted to be detachably affixed to the side of the gravity bed has one open side for receiving free flowing material from the outlet of the gravity bed. A radially adjustable discharge opening having an adjustable off-on valve is positioned at the bottom of the hopper. Suitable means are provided for journaling a shaft which extends through the hopper and carries a spreader fan at its lower extremity. The fan consists of a horizontal plate having a plurality of upstanding cup-shaped vanes mounted thereon.

The free flowing material flows from the gravity bed into the spreader hopper, through the discharge opening in the bottom of the hopper, and onto the spreader fan plate. The upstanding vanes collect the material and centrifugally hurl it away from the spreader device. The discharge angle is adjusted by rotating the discharge opening and thus changing the radial position at which the material strikes the centrifugal fan. Means are provided whereby the discharge openings may be selectively opened and closed from the tractor or other propulsion device. Means are additionally provided whereby the "on" opening of the on-off valve may be adjusted, and thus the amount of material spread over a given area may be positively controlled.

Figure 1:
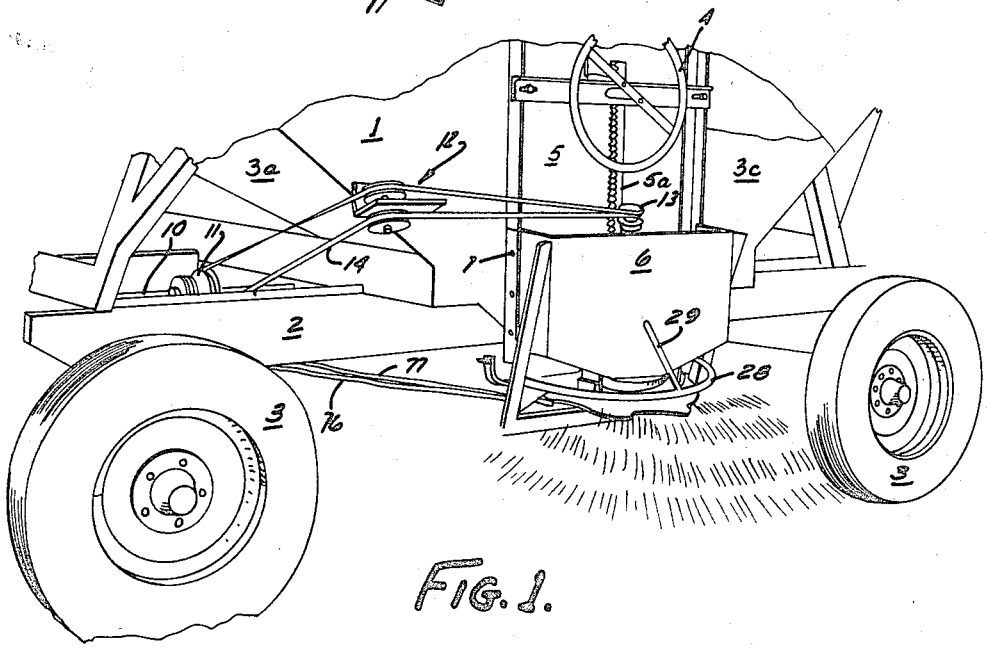
FIG. 1 is a partially broken perspective view of a standard gravity bed having the detachable spreading unit attached thereto.
Figure 3:
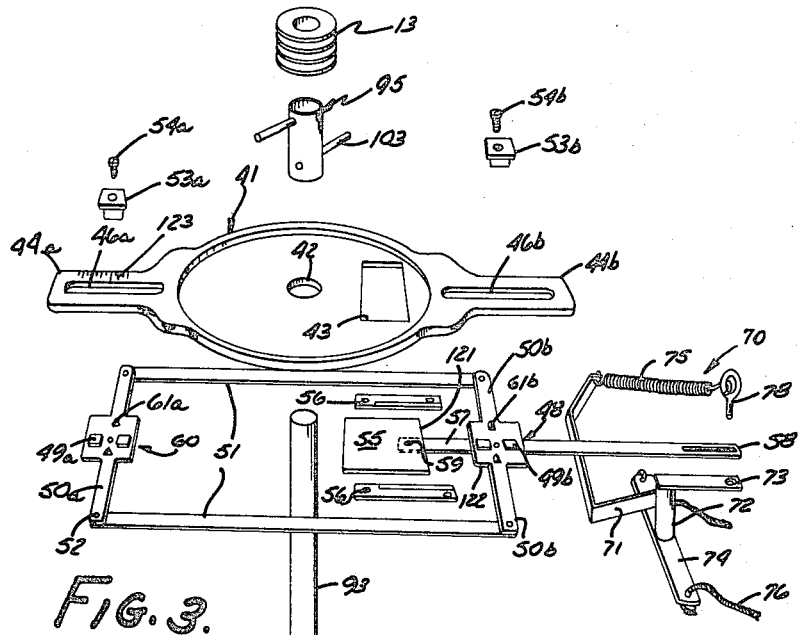
FIG. 3 is an exploded perspective showing the details of the valve, valve control and fan assemblies.
Figure 7:
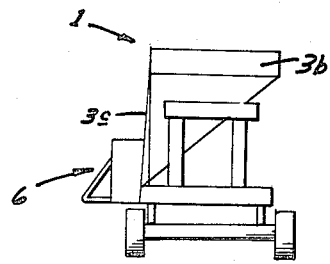
Figure 4:
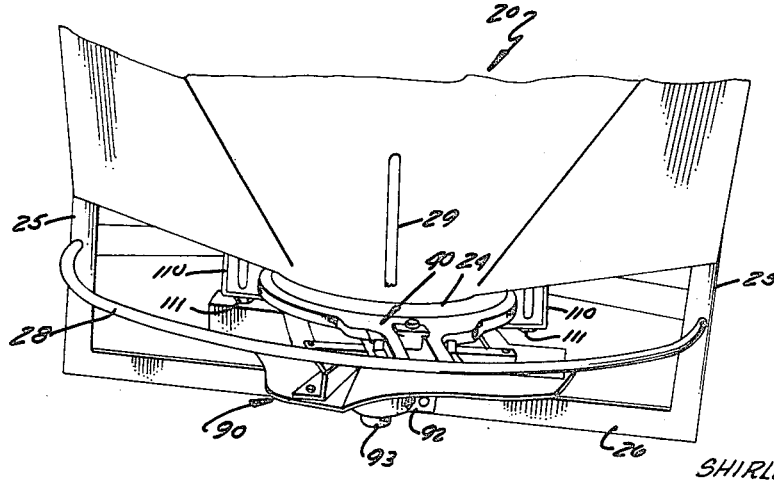
FIG. 4 is a partially broken perspective view of the spreader mechanism as viewed from the discharge side.

Referring now to the figures a preferred embodiment of this invention will be discussed in detail. FIGS. 1 and 7 show a standard gravity bed hopper 1 mounted upon a chassis 2 having wheels 3. As is well known, the gravity bed hopper is a relatively large enclosure having a front 3a, a rear 3b and two sides, one being designated as 3c and the other not shown. Side 3c is a vertical upright side toward which a plurality of surfaces converge to a discharge point or opening (not shown) the size of which is controlled by the door 5. Opening 3d is generally covered by spreader attachment 6 in FIG. 1. As will be readily apparent, free flowing material flows from the gravity bed into the spreading device through this opening 3d. The opening may be selectively opened or closed by rotating control wheel 4 which moves rack 5a attached to door 5 up or down. The up and down position of door 5 controls the quantity of the free flowing material which enters the hopper of the spreading device 6. The relatively coarse flow control capabilities of the flow valve control 4 are insufficient to positively control the amount of material being spread over a particular surface area, and thus the spreading device incorporates a second flow control valve to be discussed hereinafter.

Referring now to FIGS. 2 through 5 the assembly of the spreader mechanism will be discussed in detail. A hopper section indicated generally by the reference numeral 20 has a pair of converging side panels 21, a converging back panel 22 and a vertical front panel 23.

Figure 2:
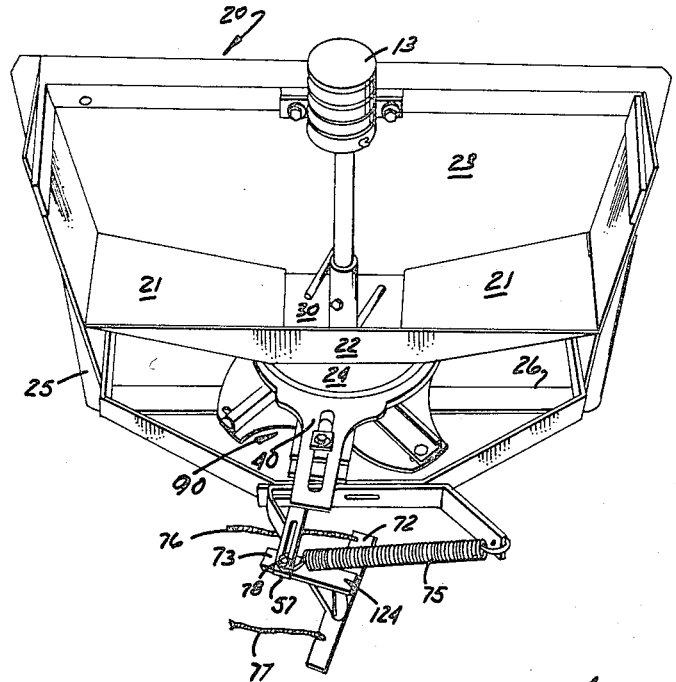
FIG. 2 is a perspective view of the spreading device from the gravity bed abutting side thereof.

As shown best in FIG. 2, the back panel 22 terminates after rising only a short distance with respect to the height of the front panel 23 to provide an opening which mates with the discharge section of the gravity bed and thus allows the material to flow from the gravity bed into collection chamber 30. The side, back and front panels of the hopper 20 converge into a circular flanged bottom 24. A pair of depending supports 25 carry a lower cross frame member 26, a control carriage 27, and a circular fan guard 28. Preferably, the circular fan guard 28 is further supported by a strut 29 attached to the front panel of the hopper.

The valve assembly indicated generally by the reference numeral 40 is composed of a cylindrical cover plate 41 which is adapted to mate with and enclose the circular flanged bottom 24 of the hopper section 20 (see FIG. 5). The tolerance between cylindrical cover plate 41 and circular flanged bottom 24 is such that the cylindrical cover plate may be rotated with respect to the hopper section. Of course, the fit must be sufficiently close to prevent the leakage of free flowing material from the mating junction. Cylindrical cover plate 41 has a shaft aperture 42 and a discharge opening 43 in the surface thereof. Cover plate 41 is secured in mating relationship with the circular flanged bottom 24 of hopper 20 by means of a pair of discharge positioning brackets 110 (see FIG. 4). The brackets are mounted such that when studs 111 are tightened an upward force is exerted against cover plate 41 in such a manner as to prevent it from rotating with respect to the hopper 20. When studs 111 are loosened cover plate 41 may be rotated with respect to hopper 20 but is held in mating relationship with circular flanged bottom 24 by means of the overlapping portions of the discharge positioning brackets 110.

Cylindrical cover plate 41 has a pair of adjustment flanges 44a and 44b extending from opposite sides thereof. The adjustment flanges 44a and 44b are permanently affixed to cover plate 41. Conveniently, these components may be fabricated in one operation. The adjustment flanges 44a and 44b each have a rectangular adjustment slot, 46a and 46b respectively, in their surfaces. A valve stop 48 having a pair of extending arms 50b mates in slidable fashion with adjustment slot 46b by means of a pair of rectangular guides 49b which are adapted to fit into adjustment slot 46b. The valve stop 48 additionally has a pair of outer guides 61b adapted to slidably stabilize the valve stop with respect to the outer longitudinal surfaces of extending adjustment flange 44b. Valve stop plate positioner 60 similarly has a pair of extending arms 50a and is adapted to slidably mate with adjustment slot 56a on extending flange 44a. Stop plate positioner 60 also has a pair of rectangular guides 49a adapted to run within slot 46a and outer guides 61a adapted to stabilize the stop plate positioner with respect to the outer longitudinal surfaces of flange 44a.

In reality, valve stop 48 and valve stop plate positioners 60 are fabricated identically although they perform somewhat different functions in the valve assembly. The extending arms 50a and 50b are connected by a pair of follower arms indicated generally at 51 by any well known means such as rivets 52. Valve stop 48 and valve stop plate positioner 60 are positioned and retained in adjustment slots 46a and 46b by means of a pair of slot mating inserts 53a and 53b and bolts 54a and 54b. For reasons which will become apparent hereinafter it is preferable that valve stop plate 48 always stay slidable with respect to flange 44b. This may be accomplished, for example, by means of double nutting bolt 54b in such a manner that valve stop 48 can be freely slid along adjustment slot 46b. The adjustment bolt 54a for the stop plate positioner 60, on the other hand, must secure stop plate positioner 60 to flange 44a so as to prevent it from sliding with respect thereto except when the valve assembly is being adjusted.

A sliding valve 55 is positioned below the discharge opening 43 in cylindrical cover plate 41. Sliding valve 55 is retained and guided by a pair of plates 56 which conveniently may be affixed directly to the bottom surface of cover plate 41. Sliding valve retainer and guide plates 56 are positioned at opposite sides of discharge opening 43 in such a manner that sliding valve 55 may traverse in the slots thereof to selectively close or open discharge opening 43. Pivotably mounted at 59 to sliding valve 55 is a valve actuator arm 57. Valve actuator arm 57 may, for example, be loosely riveted to the valve plate 55. The opposite extremity of valve actuator arm 57 has a slot 58 along its surface. By way of clarification it should be noted that valve acutator arm 57 is not attached to the valve stop 48 but may swing freely along its under surface.

Preferably, a second stop means is provided on the lower surface of cylindrical cover plate 41 to prevent sliding valve 55 from traversing too far in the inward direction and thus opening the outer circumference of discharge opening 43. Conveniently, this stop means may be provided merely by fabricating the slots of guides 56 such that they terminate at the most inward point of the sliding valve's desired travel.

The valve control assembly, indicated generally by the reference numeral 70, is composed of a bracket 71 which may be suitably affixed to control carriage 27 by means of welding or, alternatively, in slidable fashion such that critical adjustments may be made after the mechanism has been assembled. Bracket 71 carries a sleeve 72 within which is mounted a shaft having a valve control eccentric 73 affixed to its upper surface and a valve control lever 74 affixed to its lower surface. The tolerance is such that the valve control eccentric 73 may be rotated by rotating valve control lever 74. A tension spring 75, also affixed to bracket 71 but spaced from sleeve 72 (see FIG. 3) is attached to an eye bolt 78 which passes through slot 58 in valve actuator arm 57, and a mating aperture in valve control eccentric 73.

The fan assembly, indicated generally by the reference numeral 90 consists of an upper bearing 91 affixed to the front panel of hopper 20 and a lower bearing 92 affixed to frame member 26. A shaft 93 is suitably journaled in bearings 91 and 92 as indicated in FIG. 5. Shaft 93 has a drive pulley 13 affixed by suitable means such as a key and slot arrangement to its upper extremity. Shaft 93 may be vertically positioned by allowing the drive pulley to rest directly on the upper surface of bearing 91 or, alternatively, may be positioned by means of a bearing collar. Either of the positioning methods is well known in the art and it is not deemed necessary to discuss them in detail. A mixer or clog preventer 95 having fingers 103 is disposed about shaft 93 within the collection chamber of the hopper. The rotation of fingers 103 serves to insure that solidified segments of the free flowing material will be separated into small enough pieces to pass through discharge opening 43 and also to insure that the free flowing material does not lock up within hopper 20. Fingers 103 may be welded directly to shaft 93 if so desired. This type of construction eliminates the necessity of utilizing a separate sleeve to support the mixer and clog preventer 95.

Positioned below cylindrical cover plate 41 and the valve assembly 40 is the spreader fan plate 96 which is affixed to shaft 93 by means of a hub 99 for rotation therewith. Fan plate 96 has a plurality of upstanding generally channel or cup-shaped vanes 97 mounted thereon. Each of the upstanding vane ridges 101 and an inclined edge section 98 such that a channel or elongated cup having its open face or concave surface facing in the direction of rotation is formed. Preferably, upstanding cup-shaped vanes 97 are mounted in adjustment slots 101 in the face of fan plate 96 so that their positions may be slightly varied in order to accurately balance the spreader fan and thus prevent unnecessary bearing wear.

The spreader fan vanes 97 may be mounted to the fan plate 96 by any well known fastening device.

The spreading mechanism is assembled by first fabricating hopper section 20 along with its attendant framework. Cylindrical cover plate 41 is then placed over the bottom of collection chamber 30 and the brackets 110 secured to the hopper paneling. The valve 55 and the valve stop and valve stop adjustment assemblies are then affixed to the cover plate flanges 44a and 44b. The fan assembly is installed by threading shaft 93 through the bearing 91, through the clog preventer and mixer 95, through the shaft receiving aperture 42 in cylindrical cover plate 41, through the fan plate hub 99, and into lower bearing 92. Of course, if fingers 103 are welded to shaft 93 the upper bearing casing installation will be the final assembly step. The valve assembly 70 is then attached to control carriage 27 and connection is made between the valve actuator arm 57 and the valve control arm 73. Once the above assembly steps have been executed the spreading mechanism may be attached to the gravity bed in the manner shown generally in FIG. 1.

The spreader mechanism may be driven by a separate motor but, preferably, it is powered by the power take-off shaft of the tractor. When the latter power source is utilized a drive shaft 10 suitably journaled in chassis 2 is rotated by the power take-off shaft. A V-belt is connected in a well known manner from the power take-off pulley 11 to drive pulley 13 via an idler pulley assembly 12. It will be obvious that a large number of other possible driving modes are available. The power take-off drive assembly is shown by way of illustration only.

Sliding valve 55, when in open position, has its rear surface 121 abutting surface 122 of valve stop 48. The amount of material being spread per unit surface area is controlled by adjusting the position of valve stop 48 along guide slot 46b in flange 44b of cylindrical cover plate 41. Since valve stop plate 48 is not immovably affixed to flange 44b its position in slot 46b may be adjusted by merely loosening fastening means 54a and sliding the valve stop plate positioner 60 either in or out along guide slot 46a. Valve stop plate 48 is adjusted such that when sliding valve 55 abuts surface 122 the desired amount of free flowing material will be allowed to flow through discharge opening 43. Fastening device 54a is then retightened which causes valve stop plate 48 to remain stationary.

It will be apparent to those skilled in the art that the valve stop plate positioner 60, the follower arms 51, the extending arms 50b, and the extending flange 44a could be omitted from the assembly without affecting its operation. In such a case a stop plate 48 would be securely affixed in an adjustable manner to flange 44b. These components are provided, however, to facilitate the adjustment of valve stop plate 48. Their absence necessitates crawling under the gravity bed and spreading mechanism each time it is desired to adjust the position of valve stop plate 48, and thus adjust the flow of material onto the spreader fan. Conveniently, a series of score lines may be provided along the sides of flange 44a as a valve opening reference. These score lines 123 may be calibrated in volume per given time period or some other convenient units.

The valve control assembly 70 is designed in such a manner that it retains sliding valve 55 either in the closed position or in the maximum open position allowed by valve stop 48. Referring particularly to FIGS. 2 and 6 it will be seen that when it is desired to open sliding valve 55 it is only necessary to exert pressure on line 77 to the right as viewed in FIG. 2, which may conveniently lead to the tractor. This causes valve control lever 72 to pivot in a counter-clockwise fashion about pivot point 124. As valve control lever 72 pivots the eccentrically mounted valve control arm 73 pulls valve actuator arm 57 in such a manner that the valve is opened. In the open position spring 75 extends to eye bolt 78 in a path which lies on the lower side of pivot point 124 as viewed in FIG. 6. Tension spring 75 will then maintain valve actuator arm 57 in the open position. Spring 75 remains under tension because of the abutting relationship of sliding valve 55 and valve stop 48. When it is desired to close the valve assembly it is necessary only to pull line 76 to the right as viewed in FIG. 2, which may also lead to the pulling device, in such a manner that valve control lever 72 rotates in a clockwise manner about pivot point 124. This rotation forces valve actuator arm 74 inward to close the discharge opening 43. As valve control lever 72 rotates the path of tension spring 75 shifts to the upper side of pivot point 124 as viewed in FIG. 6 and thus maintaining sliding valve 55 in its closed position.

When discharge opening 43 is opened the free flowing material flows from the gravity bed, into the collection chamber, through the discharge opening and onto the surface of fan plate 96. As seen best in FIG. 5, the material strikes the fan plate when its radial position is in the vicinity of the rear side of the spreading mechanism. The free flowing material is immediately collected in cupped vanes 97 and begins to centrifugally migrate towards the ends of the vanes which are furtherest removed from hub 99. It requires approximately one-quarter of a revolution for the free-flowing material to begin leaving the cup shaped vanes in an airborne fashion. This exit process continues for approximately 180°. Thus, with the discharge opening located at its most inward point with respect to the gravity bed the material will be spread in an arc of approximately 180° extending from the rear wheel of the gravity bed to the front wheel of the gravity bed.

The exact radial distance the fan must travel before the free flowing material begins exiting therefrom is to some degree a product of the type of material which is being spread. Furthermore, it is often desirable to adjust the radial arc of displacement in such a manner that the material is spread beneath the gravity bed as well as to its side. The spreader mechanism which is the subject of this invention provides means whereby this radial distance may be controlled in such a manner as to adjust the relative radial position of the spreading arc.

When it is desired to effect such an adjustment, stud bolts 111 are loosened thus releasing the pressure exerted by clamp 110 on cylindrical cover plate 41. Cover plate 41 may then be rotated with respect to the hopper. The rotation of cover plate 41 selectively positions discharge opening 43 the desired radial distance from the point where the spreading arc is to be initiated. Once this position has been determined stud bolts 111 may be retightened and clamp 110 will again secure cover plate 41 to the hopper assembly. In FIG. 6 the cover plate is shown in solid lines in one position and in phantom lines after it has been rotated in a counter-clockwise manner. The relative positions of the discharge openings will be noted. Assuming the spreader fan to be rotating counter-clockwise as viewed in FIG. 6 the rotation of the discharge opening from the solid line position would cause the spread arc to move from under the front wheel, outside of both front and rear wheels, and finally under the rear wheel.

It will be noted that the valve control and adjustment assemblies are so constructed as to not be affected by adjustment of the radial position of discharge opening 43. The valve stop 48 and the valve stop adjustment plate 60 with their attendant linkage rotate along with cover plate 41. Sliding valve actuator arm 57 pivots about point 59 on the sliding valve 55 and remains in operable position wth respect to the valve control assembly 70. If cover plate 41 is rotated through a relatively large arc it may be necessary to readjust the valve actuator mechanism.

Thus it will be seen that this invention has provided a combination gravity bed and spreader mechanism in which the spreader mechanism may be easily attached to and detached from the gravity bed and in which, once attached, the spreader mechanism will effectively spread in the desired manner any free flowing material. While a preferred embodiment of this invention has been described together with minor modifications, it will be recognized that other modifications may be made without departing from the scope and spirit of the invention. Such modifications are to be deemed as included within the scope of the following claims unless these claims, by their language, expressly state otherwise.

I claim:
1. In a gravity bed including a bed mounted on a wheeled frame adapted for movement in a first general direction, said bed having a front, a rear and two sides upstanding therefrom to form a material reservoir, one of said sides being an essentially vertical upright side with an opening therein through which material can flow in a direction generally perpendicular to said first direction and adjustable door means for controlling the size of said opening, the improvement comprising:

a spreader mechanism including a hopper fitted over said opening, said hopper having a controllable feed means in the bottom thereof for permitting material to flow thereoutof in a downward direction;

a rotatable spreader fan located below said hopper, said fan including a generally flat plate rotatably mounted in a plane generally perpendicular to the direction of flow of material from said hopper thereonto, said plate having a plurality of upstanding vanes mounted thereon to centrifugally hurl said material sideways of said gravity bed as said fan is rotated; and means on each of said spreader mechanism and said upright side for detachably mounting said hopper on said upright side, whereby said gravity bed may be utilized with said spreader mechanism for spreading material or without said spreader mechanism for other purposes.

2. The combination as set forth in claim 1 wherein said hopper comprises a plurality of upstanding panels, one of said panels having an open section therein for mating with and receiving free flowing material from said gravity bed opening, the remainder of said panels being adapted to extend above said gravity bed exit and thus direct all of the free flowing material into said hopper.

3. The combination as set forth in claim 1 wherein said feed means includes a valve for initiating and terminating the flow of material from said hopper onto said spreader fan.

4. The combination as set forth in claim 3 in which said valve is a sliding plate adapted to slide over a discharge opening between said hopper and said spreader fan and which further comprises:

a valve stop against which said sliding plate abuts when in its open position; and means for adjustably positioning said valve stop along a line coinciding with the direction of movement of said sliding plate.

5. The combination as set forth in claim 4 wherein means are provided for rotating said valve in relation to said spreader fan whereby the angular position at which the material flowing through the discharge opening strikes said spreader fan may be adjusted.

6. The combination as set forth in claim 4 wherein said spreader fan has a shaft which extends through said hopper and which further comprises means on that segment of said shaft which is enclosed by said hopper for agitating the free flowing material before it passes through said valve whereby the plugging of said valve is prevented.

7. The combination as set forth in claim 4 which further comprises a remote control device for selectively opening and closing said valve, said device comprising:

a sleeve affixed to the frame of said hopper;

a control shaft rotatably positioned within said sleeve;

means eccentrically connecting said sliding valve to said control shaft, whereby said valve is closed when said shaft is rotated in one direction and opened when said shaft is rotated in the opposite direction; and remote control means for selectively rotating said control shaft in one direction or the other.

8. The combination as set forth in claim 7 which further comprises tension spring means connected between said frame and said eccentrically connecting means for retaining said sliding valve in abutting relation to said valve stop by shifting to one side of the control shaft axis when control shaft is rotated to the open position and for retaining said sliding valve in the closed position by shifting to the other side of the control shaft axis when said control shaft is rotated to the closed position.

9. A gravity bed-spreader combination comprising a gravity bed having a wheeled chassis adapted for movement in a first direction, said chassis having mounted thereon a bed, said bed having front and rear walls positioned generally perpendicularly to said first direction and having two sides connecting said front and rear walls to form a material reservoir, one of said sides being an essentially vertical upright side with an opening therein through which material can flow from said reservoir in a direction generally perpendicular to said first direction, said opening having an adjustable door means positioned thereover for controlling the flow of material from said bed; a spreader mechanism detachably affixed to said bed, said mechanism having a hopper with an open section on one side thereof, said open section being positioned over said opening in said upright side whereby material can flow from said reservoir into said hopper; a rotatable spreader fan located below said hopper, said hopper having controllable feed means permitting material to flow therefrom onto said spreader fan, said spreader fan being rotatably mounted for rotation in a plane generally perpendicular to the direction of flow of material from said hopper thereonto, said fan being adapted to centrifugally hurl said material sideways of said gravity bed as said fan is rotated.

References Cited

UNITED STATES PATENTS

| | | | |
|---|---|---|---|
| 1,166,477 | 1/1916 | Parrish | 239—665 |
| 1,619,795 | 3/1927 | Roby | 239—665 |
| 2,197,878 | 4/1940 | Robinson | 94—44 |
| 2,234,343 | 3/1941 | Harrington | 239—665 |
| 2,766,991 | 10/1956 | Burghardt | 239—665 |
| 2,799,431 | 7/1957 | Bush et al. | 222—457 X |
| 3,017,189 | 1/1962 | Belt | 239—665 X |
| 3,158,375 | 11/1964 | Vig | 239—665 X |
| 3,170,264 | 2/1965 | Waldrum | 239—681 X |
| 3,220,740 | 11/1965 | Kavan et al. | 239—687 X |
| 3,287,021 | 11/1966 | Herd | 239—665 X |

M. HENSON WOOD, Jr., *Primary Examiner.*

V. C. WILKS, *Assistant Examiner.*